United States Patent
Duley

[11] Patent Number: 5,526,253
[45] Date of Patent: Jun. 11, 1996

[54] LOW POWER VOLTAGE BOOST CIRCUIT WITH REGULATED OUTPUT

[75] Inventor: Raymond S. Duley, Buda, Tex.

[73] Assignee: Advanced Micro Devices, Inc., Sunnyvale, Calif.

[21] Appl. No.: 125,287

[22] Filed: Sep. 22, 1993

[51] Int. Cl.⁶ ..................... H02M 3/18
[52] U.S. Cl. ..................... 363/59; 363/60
[58] Field of Search ............. 363/590, 60

[56] References Cited

U.S. PATENT DOCUMENTS

| | | | |
|---|---|---|---|
| 4,149,232 | 4/1979 | Eaton | 363/60 |
| 4,593,346 | 6/1986 | Nooijen et al. | 363/60 |
| 4,616,303 | 10/1986 | Mauthe | 363/60 |
| 4,888,677 | 12/1989 | Grimm et al. | 363/60 |
| 5,280,420 | 1/1994 | Rapp | 363/60 |
| 5,306,954 | 4/1994 | Chan et al. | 363/60 |
| 5,331,255 | 7/1994 | Banbury et al. | 363/60 |
| 5,357,419 | 10/1994 | Limpaecher | 363/60 |
| 5,394,320 | 2/1995 | Blodgett | 363/60 |
| 5,414,614 | 5/1995 | Fette et al. | 363/59 |

FOREIGN PATENT DOCUMENTS

| | | | |
|---|---|---|---|
| 0350462A2 | 1/1990 | European Pat. Off. | H02M 3/07 |
| 0477108A3 | 3/1992 | European Pat. Off. | H02M 3/07 |

Primary Examiner—Jeffrey L. Sterrett
Attorney, Agent, or Firm—Kevin L. Daffer

[57] ABSTRACT

A voltage boost circuit is provided for amplifying or boosting an input voltage to a higher voltage level while also providing a regulated voltage amount for the boosted output. The voltage boost circuit with regulated output is well suited for low power applications by providing an oscillator which can be switched between normal mode and standby mode of operation depending upon the voltage state of the amplified output. Once the voltage state is at or within a regulated range, the oscillator can be placed in a standby state and the power consumption normally associated with amplifier or oscillator operation is considerably reduced. A voltage multiplier ensures that the output voltage is maintained over a fairly long period of time without requiring active refresh and power consumption normally associated therewith.

23 Claims, 4 Drawing Sheets

LOW POWER VOLTAGE BOOST CIRCUIT WITH REGULATED OUTPUT

BACKGROUND OF THE INVENTION

1. Field of the Invention

This invention relates to an electronic circuit and more particularly to a circuit for boosting a voltage to a regulated value and for maintaining the regulated value over a wide variety of load demands.

2. Background of the Relevant Art

Amplifiers for boosting power or voltage are well known. Power amplifiers are designed to provide large current to the output load. The load impedance must be low enough to allow a high-current output, but not so low that the signal is distorted excessively. Voltage amplifiers increase the voltage level of an applied signal but do not necessarily increase the power to the output load. Both power amplifiers and voltage amplifiers can be achieved using various circuit configurations. For example, amplification can be performed using electron tube amplifiers or solid-state transistors such as bipolar or MOS transistors.

A problem associated with many amplification circuits is the relatively large amount of power required to drive the circuits. In particular, power amplifiers require a large amount of output current and therefore cannot, in most cases, be used in low-power applications. Likewise, voltage amplifiers often utilize op-amps or bipolar transistors which consume a large amount of current when active. Still further, in order to provide amplification, the amplifier circuit is generally maintained in an "on" condition throughout its operation. Thus, the amplifier circuit consumes power the moment it is turned on until it is subsequently turned off.

In many applications, it is important that voltage amplification be achieved with minimum power consumption. Examples of low-power applications include battery-operated devices, one of which is a portable computer. A portable computer can operate in various modes of operation, including a standby mode and a full power mode. During standby operations, power drain upon the computer's battery or AC wall unit is minimized. During full power operation (i.e., whenever the display is on, CPU is operating at full speed, peripheral devices are on, resume switch is on, and/or a modem ring is detected), power drain is not minimized. The computer is selectively placed in the standby or full power mode whenever respective power switching transistors which drive the computer are turned off or on by the power management logic. It is important, however, that whenever a selection is made, the power transistors which are active are fully placed in full saturation region. If the power transistors which are coupled between the power source and the computer load are not placed fully within saturation, then the "on" resistance of the transistors will consume an unacceptable amount of power.

Selectively activating the power transistors in order to choose a mode of operation is important to portable computer functionality. It is not only important that the large power transistors which provide power management switching of the portable computer be carefully monitored in order to ensure their on resistance is minimized, but is also important that select power transistors when chosen to be off are fully off. If the transistors remain slightly on, then deleterious leakage current will exists causing a waste of power.

The amplifying circuit is thereby necessary for providing amplified voltages to the gates of the power transistors (n-channel MOSFETs) which selectively modulate power (standby, full, etc.) to the portable computer. The output voltage from the amplifier to the power transistor's gate must be higher than the input voltages which powers the computer—the input voltages being coupled to both the amplifier circuit and the power transistor's source or collector—in order to ensure the transistors are fully driven into the saturation region when selected. Although the amplified output voltage must be larger than the input voltage, it is important that the power consumed by the amplifier necessary to maintain the amplified output to the power transistors (or load) be minimized.

SUMMARY OF THE INVENTION

The problems outlined above are in large part solved by the voltage boosting or voltage amplification circuit of the present invention. That is, the voltage boosting circuit hereof can provide an output voltage to the power transistors (associated with a low-power load device) which is higher than the input voltage. The amplified output voltage sent to the gate of the n-channel power transistors (FETs) ensures the transistors, when active, are fully on. Control circuitry, also coupled to the gate of the power transistors, likewise provides shorting of the amplified output necessary to prevent, when inactive, any turn on or leakage through the transistors.

The voltage boosting circuit utilizes a voltage feedback network necessary for regulating the amplified voltage output. only when the amplified output diminishes below a specified level (i.e., is outside a regulated voltage amount) will the feedback voltage cause amplifier activity. Conversely, the amplifier circuit is not active and will not consume minimum power when the amplified output is approximately equal to a regulated voltage or within a regulated voltage range. A storage capacitor and a reverse-biased diode help retain the amplified output value at the regulated voltage amount. Reduction in the stored value is thereby dependent primarily upon current drawn by load. This load is comprised of pull-up resistors and gate impedance associated with the power transistors.

The output voltage is regulated to both a maximum and a minimum value, and preferably is regulated to approximately one and one half times the input voltage. The voltage boosting circuit automatically fixes a limit (i.e., maximum regulated value) upon which the output voltage cannot exceed. Furthermore, if the amplified output voltage falls below a specified amount (i.e., minimum regulated value) then the amplifier is brought on line and the voltage is again boosted to the regulated amount. Through feedback, the amplifier circuit automatically establishes an optimal output voltage sent to the power transistors in order to assure that the selected power transistor is either fully on or fully off—a necessary requirement for low power portable computer application.

Broadly speaking, the present invention contemplates a voltage boost circuit capable of providing a regulated output voltage to a load device, such as a portable computer. The boost circuit utilizes low power operating principles by amplifying an input voltage to a specified regulated output level and then maintaining that level without the necessity of a fully active amplifying circuit. The voltage boost circuit comprises an oscillator having an input and an output, wherein the input is adapted to receive an input voltage and a reference voltage. A voltage multiplier is coupled to the output of the oscillator and is capable of storing an output voltage thereon which is greater than the input voltage. A control regulator is coupled to the output of the voltage multiplier such that the input of the control regulator is adapted to receive a portion of the output voltage and a portion of the input voltage. The control regulator is capable of deactivating the oscillator during times in which the output voltage is within a regulated voltage amount. Thus, the control regulator operates as a feedback control to the oscillator based upon the voltage value stored within the voltage multiplier. The regulated voltage amount is a voltage magnitude proportional to the input voltage. Moreover, the regulated voltage amount is substantially equal to one and one half times the input voltage, or is within a range exceeding the input voltage and less than one and one half times the input voltage.

The control regulator comprises an output coupled to a charging node associated with the oscillator for shorting the node during times in which the oscillator is deactivated. The oscillator preferably comprises three comparators connected in series, with an output of the control regulator connected to the charging node which is configured between a pair of series-connected comparators. The voltage multiplier comprises a first diode and a second diode, wherein an anode of the first diode is connected to receive the input voltage, and a cathode of the first diode is connected to an anode of the second diode and to a boost capacitor. The boost capacitor, within the voltage multiplier, helps retain the output voltage to the regulated amount and is coupled between the oscillator and the first and second diodes. The voltage boost circuit further comprises a sensor connected between the voltage multiplier and the control regulator for sensing times in which the output voltage is within the regulated voltage amount and for filtering out transient voltages from the output voltage. The sensor comprises a voltage divider resistive network and a low pass filter.

The present invention further contemplates a voltage boost circuit with regulated output, wherein the boost circuit comprises an oscillator, a voltage multiplier, and a control regulator. The oscillator has an input and an output, the input is adapted to receive an input voltage and a reference voltage. The voltage multiplier is coupled to the output of the oscillator and is capable of storing an output voltage thereon which is greater than the input voltage. The control regulator has an input adapted to receive a portion of the output voltage and a portion of the input voltage. The control regulator is also capable of modulating the output voltage at the output of the voltage multiplier to a regulated voltage amount.

The present invention still further contemplates a regulated power supply for a portable load device. The regulated power supply comprises a power source and an oscillator having an input and an output. The oscillator input is adapted to receive an input voltage and a reference voltage derived from the power source. A voltage multiplier is coupled to the output of the oscillator for storing an output voltage thereon which is greater than the input voltage. The voltage multiplier further comprises a first diode, a second diode and a boost capacitor, wherein an anode of the first diode is connected to receive the input voltage and a cathode of the first diode is connected to an anode of the second diode and to the boost capacitor. The regulated power supply also includes a control regulator having an input adapted to receive a portion of the output voltage and a portion of the input voltage, wherein the control regulator is capable of regulating the output voltage at the output of the voltage multiplier to a regulated voltage amount. The regulated power supply still further includes a power transistor having a conductive path modulated by the output voltage, wherein the conductive path is configured between the power source and a portable load device. Alternatively a plurality of power transistors may be provided which include a plurality of gates and conductive paths. The gates are adapted to receive the output voltage and the conductive paths are coupled between the power source and the plurality of portable load devices. A plurality of control circuits with corresponding outputs are connected to respective gates in order to selectively control the output voltage being sent to the power transistors. The load devices comprise a standby load circuit, a main power load circuit and a battery. Each load device is capable of drawing power through a respective conductive path in response to the output of a respective control circuit.

BRIEF DESCRIPTION OF THE DRAWINGS

Other objects and advantages of the invention will become apparent upon reading the following detailed description and upon reference to the accompanying drawings in which.

Figure 1:
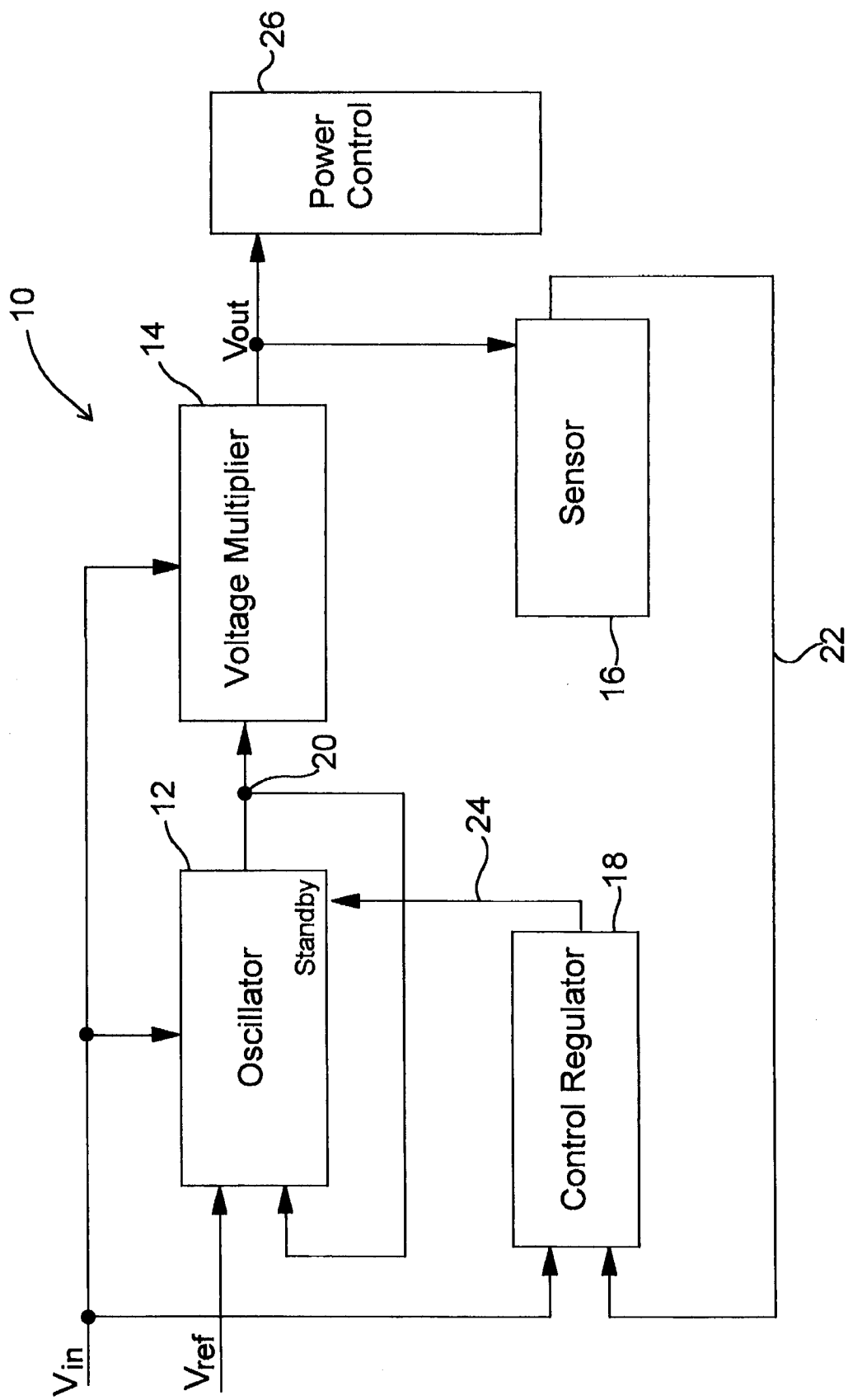
FIG. 1 is a block diagram of a voltage boost circuit according to the present invention shown connected to a load device.

While the invention is susceptible to various modifications and alternative forms, specific embodiments thereof are shown by way of example in the drawings and will herein be described in detail. It should be understood, however, that the drawings and description thereto are not intended to limit the invention to the particular forms disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 illustrates a block diagram of a voltage boost circuit 10. Boost circuit 10 comprises an oscillator 12, a voltage multiplier 14, a sensor 16 and a control regulator 18. Oscillator 12, voltage multiplier 14 and control regulator 18 are adapted to receive an input voltage, Vin. Input voltage magnitude can range anywhere from 5 volts to 20 volts, or even higher, depending upon the source power necessary for operating MOS transistors within circuit 10. Preferably, input voltage is between 5 volts and 12 volts, while reference voltage, Vref, is a fraction of the input voltage. A preferred reference voltage is approximately 2.5 volts, given an input voltage of 12 volts.

Once input voltage exceeds 3.0 volts (i.e., exceeds the threshold amount of oscillator 12) and achieves an operational value, boost circuit 10 begins operation. Oscillator 12 starts oscillation by producing a periodic output at node 20. Oscillator output ranges between 0 volts to Vin. Oscillating node 20 drives voltage multiplier 14 such that multiplier 14 amplifies the signal to an output voltage, Vout, level. Output voltage is approximately twice the input voltage magnitude, absent feedback signal 22 sent from sensor 16 to control regulator 18. However, as will be appreciated by the description hereinbelow, a feedback path ensures that the output voltage will be regulated before it reaches an amount twice the input voltage.

Sensor 16 provides feedback of output voltage to control regulator 18. Sensor 16 sends a portion of the output voltage to control regulator 18, filters out transient, high frequency noise upon the output voltage signal, and also delays the feedback/output sense signal 22. Control regulator 18 receives a proportional amount of output voltage as well as a proportional amount of input voltage and, based upon a comparison of the two inputs, provides a standby signal 24 to oscillator 12. Standby signal 24 provides control or modulation of voltage boost produced from oscillator 12 and multiplier 14. As will be described hereinbelow, when standby signal 24 is active, oscillator 12 ceases operation and goes into standby or power down mode. Thus, when placed in standby mode, oscillator 12 no longer consumes power except for insignificant leakage current, and output voltage is passively maintained for a substantial length of time within voltage multiplier 14.

By utilizing feedback signal 22 indicative of output voltage magnitude and by comparing the standby signal to a proportion of the input signal, control regulator 18 assumes control of oscillator 12 via timed standby signal 24. Control regulator 18 thereby regulates the power drawn through boost circuit 10 by regulating power consumption within the active components of oscillator 12. Oscillator 12 normally provides boosting control/function of circuit 10; however, once deactivated by standby signal 24, oscillator 12 no longer drives the input voltage necessary to produce the boosted output voltage. Instead, output voltage is substantially maintained using passive storage components (described hereinbelow) connected to the output of circuit 10.

As shown in FIG. 1, boost circuit 10 is capable of providing controlling voltage or output voltage to a load device such as a portable computer. In particular, boost circuit 10 is capable of maintaining a regulated output voltage to a power control circuit 26, normally associated with a low power, often portable, device. Therefore, a regulated power supply is achieved which includes voltage boost circuit 10 as well as power control circuit 26. Power control circuit 26 generally includes logic circuitry necessary for driving various power management operational modes of, e.g., a low power portable computer. Circuit 26 also includes different load values (or devices) which can be programmed within a portable computer such as, e.g., standby load, full power load, or a rechargeable battery. Well known to a skilled artisan is the standby, full power and battery charge capabilities of a portable computer. Various techniques and principles used to activate these modes of operations are well recognized in the portable computer industry.

Figure 2:
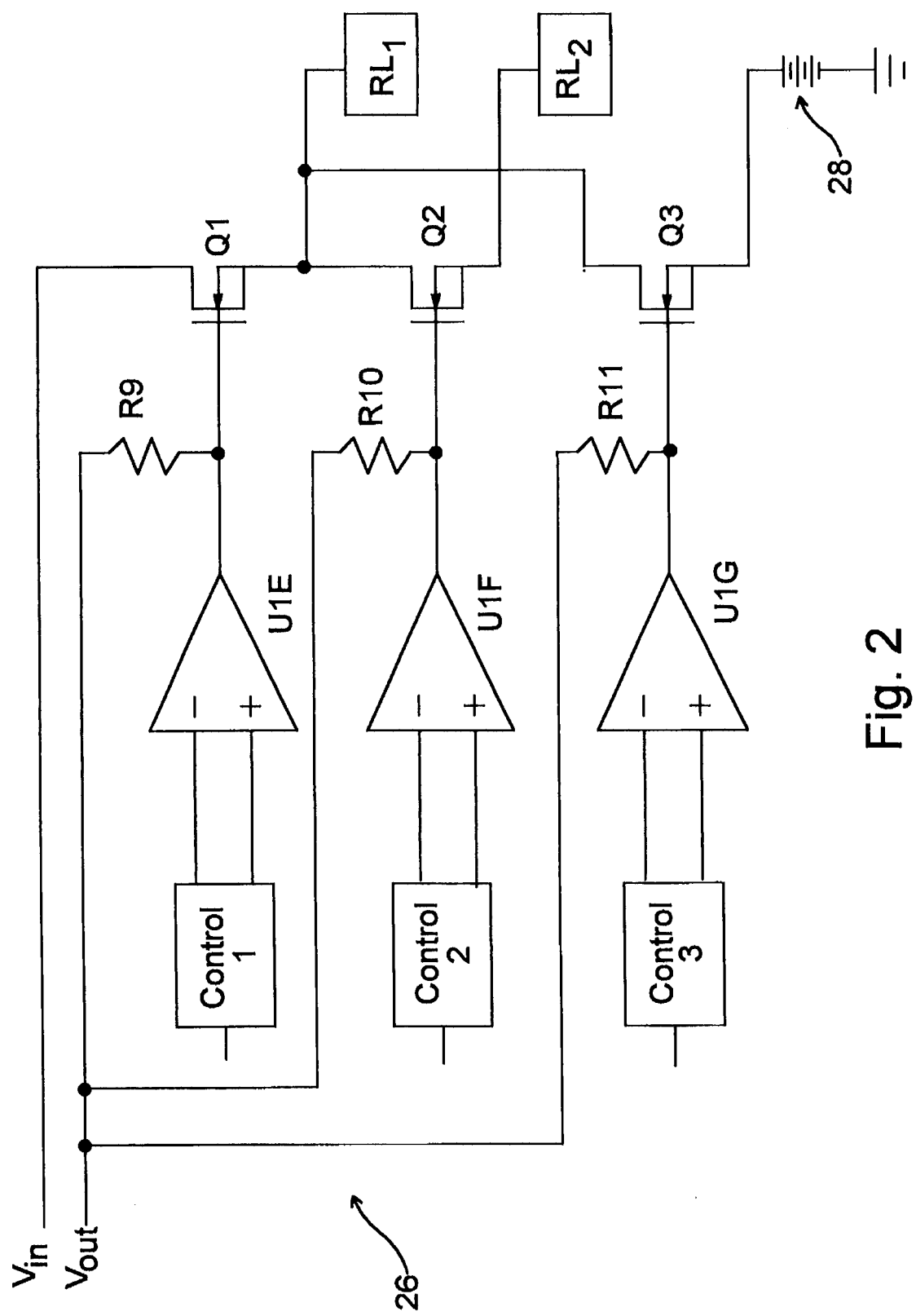
FIG. 2 is a circuit diagram of a load device with power controlling features according to the present invention.

Turning now to FIG. 2, power control circuit 26 with load devices are shown. Power control circuit 26 receives power similar to circuit 20 from a power source such as an AC wall unit or main battery pack 28 in order to provide input power. Input voltage is regulated to various load devices, $RL_1$, $RL_2$ and battery 28. $RL_1$ may, for example, represent standby load attributed to a portable computer placed in a standby mode, whereas $RL_2$ may represent, for example, the load associated with a portable computer's full-power load. Output voltage generated from boost circuit 10 is coupled to pull-up resistors R9, R10 and R11, each resistor is coupled to the output of a comparator U1E, U1F or U1G. Furthermore, output voltages are coupled through pull-up resistors R9, R10 and R11 to the gate of n-channel transistors Q1, Q2 and Q3.

Well known in MOS technology is the operation of n-channel transistors Q1, Q2 or Q3. Whenever the gate-to-source voltage exceeds a threshold amount, the n-channel transistor will turn on. Provided the gate voltage is substantially higher than the source voltage, the n-channel transistor will turn fully on and into the saturation region. Once in the saturation region, the on resistance of the corresponding transistor is extremely small and, in some instances, can be less than 10 ohms. It is desirable that output voltage be substantially high and greater than the input voltage in order to ensure the gate-to-source voltage is large and that the resulting on resistance is very small. Thus, output voltage from boost circuit 10 is by design much larger than the input voltage which feeds boost circuit 10 and control circuit 26.

The amount of voltage provided at the gates of respective n-channel transistors Q1, Q2 and Q3 is not only regulated by the amount of output voltage through pull-up resistors R9, R10 and R11, but is also regulated by the logic state at the output of comparators U1E, U1F and U1G. Specifically, output logic from each comparator is controlled by logic controllers, control 1, control 2 and control 3. For example, a high output from control 1 to non-inverting input of U1E (with respect to the inverting input of U1E) produces a logic one at the gate of transistor Q1. Pull-up resistor R9 and voltage magnitude of the output voltage ensures a boosted voltage of the logic one state at the gate of transistor Q1. The boosted voltage (boosted beyond the source voltage stored at the high impedance source node of $RL_1$) operates to turn transistor Q1 fully on and minimizes on resistance within the transistor's conduction path. Thus, proper output from control 1 can provide full power through computer load $RL_1$ and, if transistors Q1 and Q3 are both fully on, can charge battery 28.

Similar to control 1, control 2 also functions to control the voltage magnitude at the gate of its respective power transistor Q2. If control 2 produces a lesser voltage magnitude at the non-inverting input of comparator U1F (with respect to the inverting input), then the logic output at the gate of transistor Q2 is at a logic zero level. Accordingly, resistor R10 will sink current from output voltage through the on transistor of the open collector arrangement of comparator U1F. A resulting low gate voltage (less than a threshold amount above the source voltage) forces a high off resistance of transistor Q2. Load $RL_2$ will therefore not receive input voltage. Control 3 functions similar to control 1 and control 2, and can be used to provide selective charging power to battery 28. Furthermore, once charged, battery 28 can provide auxiliary battery power to establish input voltage within circuit 10 as well as circuit 26.

Figure 3:
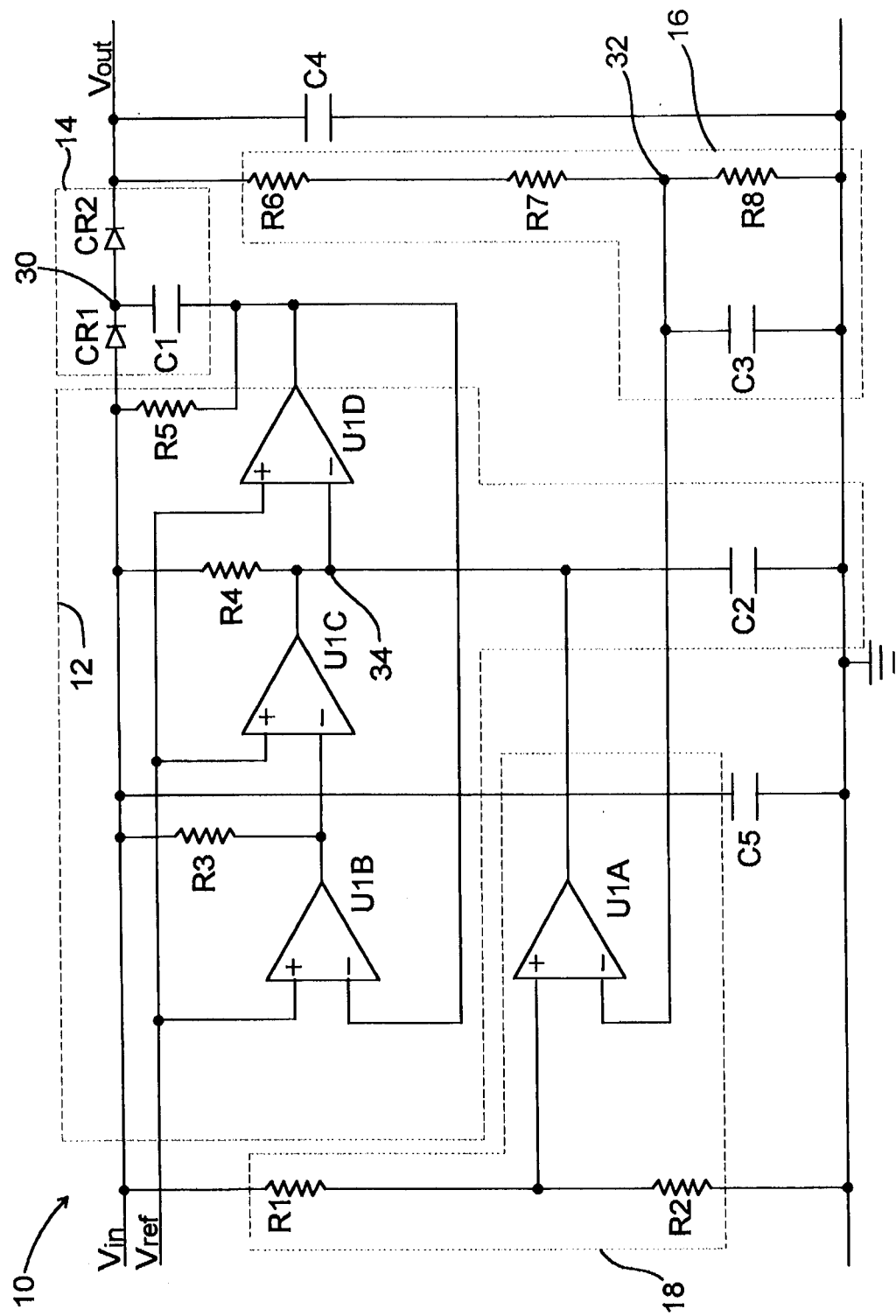
FIG. 3 is a circuit diagram of the voltage boost circuit according to the present invention.

Referring now to FIG. 3, a circuit diagram of voltage boost circuit 10 is shown. Also shown in dashed line is oscillator 12, voltage multiplier 14, sensor 16 and control regulator 18. Oscillator 12 includes three comparators U1B, U1C and U1D, as well as three pull-up resistors R3, R4 and R5, and also includes a charging capacitor C2. Charging capacitor C2 also operates as a timing capacitor, whereby capacitor C2 value reflects operating frequency of oscillator 12. Oscillator 12 will begin oscillation once input voltage is greater than a value necessary to operate the comparators (e.g., Vin=5 volts), and after Vref is provided (e.g., Vref=a fraction of Vin, or approximately 2.5 volts). Oscillator 12 will also begin oscillation if comparator U1A output is at a logic one. Output of comparator U1A is placed in a logic one, which occurs whenever the open collector output of comparator U1A is placed in a high impedance state, e.g., whenever the open collector output transistor is turned off allowing the pull-up resistor R4 to pull-up charging node 34 to a high value. Suitable resistance values for pull-up resistors R3 and R4 can be 100K ohms and charging capacitor C2 can be 0.0001 µf. Furthermore, comparators U1B, U1C and U1D as well as comparator U1A can be formed in a low power quad comparator integrated circuit, part no. LP339, available from National Semiconductor, Santa Clara, Cal.

Operation of oscillator 12 is fairly well known. Assuming an initial state of U1D output to be at a logic zero, the following logic states occur: U1B output switches to a logic one (high impedance comparator output will pull-up resistor R3) and U1C output switches to a logic zero (discharging the charging capacitor C2). Furthermore, given a logic zero at the inverting input of U1D comparator, output of U1D switches from logic zero to logic one (high impedance comparator output will pull-up resistor R5). When U1D output switches to logic one, U1B output switches to logic zero, and then U1C output switches to logic one causing high impedance comparator output and charging of capacitor C2 via resistor R4. Capacitor C2 charges and discharges to form a time constant approximately equal to R4*C2. Given the exemplary values described hereinabove, the time constant can be approximately 10 µsec. When C2 is charged to greater than the reference voltage, U1D senses this condition and switches its output to logic zero again. The oscillation frequency is dependent upon the time constant of R4 and C2 product and three comparator propagation delays. For the values described above, the frequency of oscillation can be approximately 20 µsec or 50 KHz. It is recognized that other values for R4 and C2 may produce other frequencies of oscillation. It is desirable that the frequency of oscillation can be easily varied by changing C2 or R4 magnitude. The oscillation condition repeats until one of the following conditions exists: input voltage is turned off, or U1A output is driven (via feedback) to a logic zero.

Voltage multiplier 14 comprises switching diodes CR1 and CR2 as well as boosting capacitor C1. Voltage multiplier 14 generates a voltage greater than its input voltage whenever Vin goes positive necessary to begin oscillator 12 operation. If, for example, U1D output switches from logic one to logic zero, then capacitor C1 charges to a voltage potential of approximately Vin (input voltage) due to the forward biasing of diode CR1. CR1 and CR2 are generally forward biased during initial turn-on of circuit 10, wherein CR1 charges capacitor C1 and diodes CR1 and CR2 drive control circuit 26 as described above. When U1D output switches from logic zero to logic one, capacitor C1 then transfers input voltage transition to node 30. Transferal of charge to node 30 causes boost of voltage at that node, and reverse biases CR1 in order to retain the boosted voltage. Even though diode CR2 is forward biased, high input gate impedance at the respective power transistors Q1, Q2 and Q3 minimizes load current. It is preferred that diodes CR1 and CR2 be fast switching diodes with greater than 30 volt, 25 mA rating. A suitable diode can be purchased as part no. 1N914 from National Semiconductor, Santa Clara, Cal.

Once a boost voltage is established at node 30, the boosted voltage can be transferred to power control circuit 26 and can also be regulated via sensor 16 and control regulator 18. Output storage capacitor C4 delivers the boosted voltage and associated output to circuit 26. Sensor 16 and control regulator 18 operate to feedback a signal from the output voltage and can compare that signal to the input voltage in order to regulate operation of oscillator 12. Sensor 16 comprises a voltage divider made up of three resistors R6, R7 and R8, and a timing capacitor C3. Exemplary resistor values for resistors R6, R7 and R8 are 100K ohm, and capacitors C3 and C4 are 0.01 µf. Voltage divider resistors provide a proportion of the output voltage at node 30 to the inverting input of comparator U1A of control regulator 18. The proportion can be any amount, a preferable proportion being ⅓ Vout at node 32. In order to achieve that proportion, each resistor of the voltage divider is of equal resistance value. Capacitor C3 is placed in parallel with the inverting load input of comparator U1A to provide a low pass filter which delays the feedback voltage and filters high frequency components such as ripple or noise voltages from the output voltage signal.

Control regulator 18 is comprised of voltage comparator U1A and voltage divider resistors R1 and R2. Resistors R1 and R2, like divider resistors R6, R7 and R8, can be 100K ohm resistors and are conveniently available within a resistor pack of generic design. Regulator 18, through comparator U1A, senses when the output voltage is within a regulated voltage amount. If, for example, resistors R1 and R2 are of equal 100K ohm value, then the inverting input of comparator U1A is equal to ½ the input voltage and, providing resistors R6, R7 and R8 are of equal value, the inverting input of comparator U1A is equal to ⅓ the output voltage. Thus, when the output of boost circuit 10 is at a regulated voltage amount, or within a regulated voltage range, the following equation applies: Vout/3=Vin/2. Thus, Vout equals 3/2*Vin, such that when Vout achieves the above regulated voltage amount, U1A output transitions to a logic zero causing a fixed low voltage state or short at node 34 of oscillator 12. Node 34 is retained at a logic zero level, whereas output of comparator U1D transitions to a logic one thereby causing output of comparator U1B to transition to a logic zero; however, output of comparator U1C remains at a logic zero forcing a steady state value within oscillator 12. The regulated voltage amount on control regulator 18 places oscillator 12 in a standby steady state necessary for power management and substantially minimizing power drain within oscillator 12.

Figure 4A:
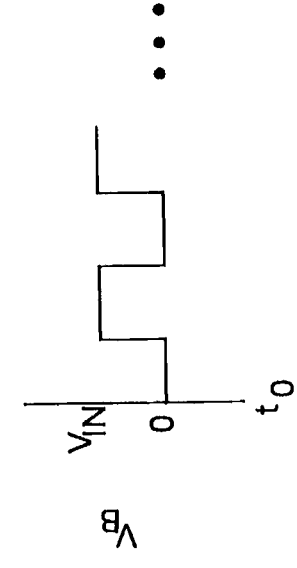
FIG. 4a–4d are graphic representations of voltages appearing at various points in the boost circuit according to the present invention, plotted as a function of time.
Figure 4A:
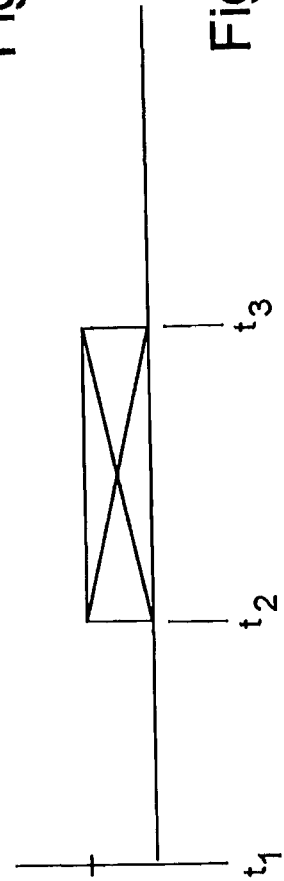
Figure 4B:
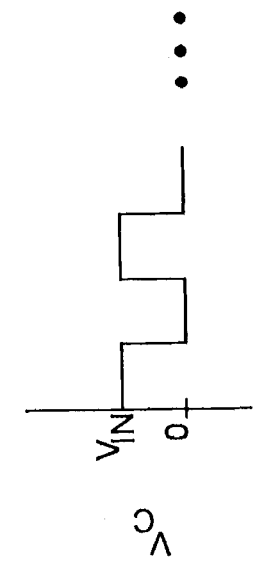
Figure 4B:
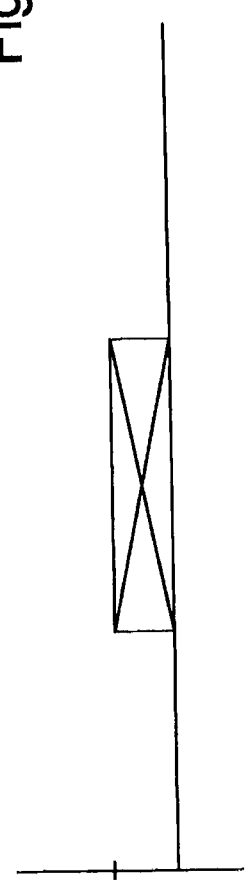
Figure 4C:
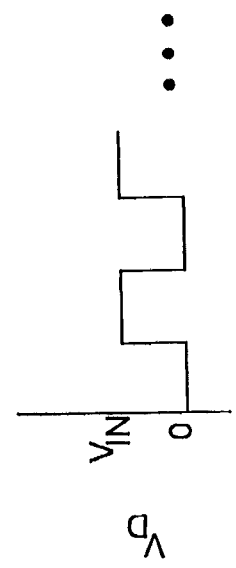
Figure 4C:
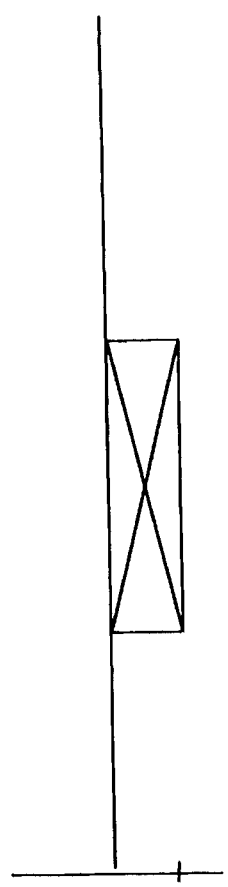
Figure 4D:
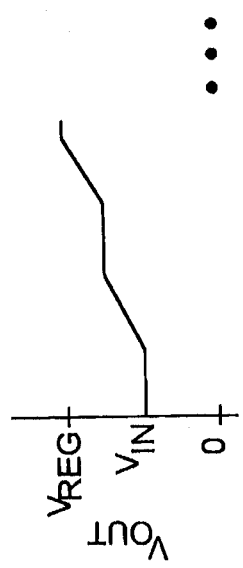
Figure 4D:
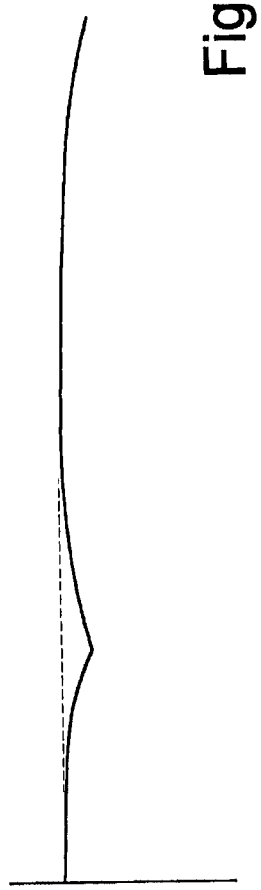

By placing oscillator 12 in a standby state, considerable power is saved within boost circuit 10 thereby minimizing drain upon the portable power supply of, for example, a portable, battery driven computer. The timing diagrams of FIGS. 4a–4d further illustrate the operating principles of boost circuit 10 at times in which oscillator 12 is at a standby state and at times in which oscillator 12 is not in a standby state. As defined herein, standby state occurs whenever the output voltage, Vout, is at a regulated voltage amount or is within a regulated voltage range. A suitable regulated voltage amount can be approximately one and one half the input voltage. A regulated voltage range can extend anywhere substantially above Vin (at least a threshold value above Vin) to one and one half times Vin. As shown in FIG. 4a, the output voltage from comparator U1B toggles between a high a low state (Vin to zero volts) during non-standby operation from time t0 to time t1. Likewise, comparator U1C output and comparator U1D output toggle during the non-standby operation mode between times t0 and time t1. Oscillator operation causes node 30 output, shown in FIG. 4d, to boost beyond the input voltage to a regulated voltage amount, Vreg. After output voltage has achieved a regulated voltage amount (at time t1), oscillator 12 then goes into a standby mode whereby U1B, U1C and U1D outputs are fixed at their respective logic levels and ceases transitions. The standby mode is shown between times t1 and t2. Certain amounts of leakage occurs at node 30 causing decline in output voltage, Vout, as shown in FIG. 4d. Whenever Vout goes below a specified tolerance range of the regulated voltage amount, a feedback signal 22 is then sent to voltage regulator 18 causing cessation of the standby mode and allowing oscillator 12 to begin operation as shown between times t2 and t3. After boosting capacitor C1 charges node 32 to its regulated value (at time t3), oscillator 12 is then placed back into its standby mode.

It will be appreciated to those skilled in the art having the benefit of this disclosure that this invention is believed to be capable of applications with numerous types of portable load devices. An exemplary load device is illustrate and described herein as a portable computer having various modes of operation. It is further appreciated that other forms of portable devices having more or less than three modes of operation (thereby having more or less than three power transistors) may be encountered and properly serviced by the boost circuit hereof. It is also to be understood that the form of the invention shown and described is to be taken as a presently preferred embodiment. Various modifications may be made without departing from the spirit and scope of the invention as set forth in the claims. An exemplary modification might be one which uses counter circuits or any other form of circuitry other than comparators and/or pull-up resistors. Moreover, component values for pull-up resistors, voltage divider resistors, coupling capacitors, timing capacitors, storage capacitors and boost capacitors can be varied depending upon the required frequency of operation as well as the switch points necessary to achieve varying regulated voltage amounts. It is intended that the following claims be interpreted to embrace all such modifications and changes.

What is claimed is:

1. A voltage boost circuit with regulated output, comprising:

an oscillator having an input and an output, said input is adapted to receive an input voltage and a reference voltage;

a voltage multiplier coupled to the output of said oscillator capable of storing an output voltage thereon which is greater than said input voltage; and a control regulator having an input adapted to receive a portion of said output voltage and a portion of said input voltage, wherein said control regulator is capable of deactivating said oscillator during times in which said output voltage is within a regulated voltage amount.

2. The voltage boost circuit as recited in claim 1, wherein said regulated voltage amount is a voltage magnitude proportional to said input voltage.

3. The voltage boost circuit as recited in claim 1, wherein said control regulator comprises an output coupled to a charging node associated with said oscillator for shorting said node during times in which said oscillator is deactivated.

4. The voltage boost circuit as recited in claim 1, wherein said oscillator comprises three comparators connected in series with an output of said control regulator connected to a charging node configured between a pair of series-connected comparators for shorting said node during times in which said oscillator is deactivated.

5. The voltage boost circuit as recited in claim 1, wherein said voltage multiplier comprises a first diode and a second diode, wherein an anode of the first diode is connected to receive the input voltage and a cathode of the first diode is connected to an anode of the second diode and to a boost capacitor.

6. The voltage boost circuit as recited in claim 5, wherein said boost capacitor is coupled between said oscillator and the first and second diodes.

7. The voltage boost circuit as recited in claim 1, further comprising a sensor connected between said voltage multiplier and said control regulator for sensing times during which said output voltage is within said regulated voltage amount and for filtering out transient voltages from said output voltage.

8. The voltage boost circuit as recited in claim 7, wherein said sensor comprises a resistor divider and a low pass filter.

9. A voltage boost circuit with regulated output, comprising:

an oscillator having an input and an output, said input is adapted to receive an input voltage and a reference voltage;

a voltage multiplier coupled to the output of said oscillator capable of storing an output voltage thereon which is greater than said input voltage; and a control regulator having an input adapted to receive a portion of said output voltage and a portion of said input voltage, wherein said control regulator is capable of regulating said output voltage at the output of said voltage multiplier to a regulated voltage amount.

10. The voltage boost circuit as recited in claim 9, wherein said regulated voltage amount is substantially equal to one and one half times said input voltage.

11. The voltage boost circuit as recited in claim 9, wherein said regulated voltage amount comprises a range exceeding said input voltage and less than one and one half times said input voltage.

12. The voltage boost circuit as recited in claim 9, wherein said regulated voltage amount is a voltage magnitude proportional to said input voltage.

13. The voltage boost circuit as recited in claim 9, wherein said control regulator comprises an output coupled to a charging node associated with said oscillator for shorting said node during times in which said output voltage exceeds said regulated voltage amount.

14. The voltage boost circuit as recited in claim 9, wherein said oscillator comprises three comparators connected in series with an output of said control regulator connected to a charging node configured between a pair of series-connected comparators for shorting said node during times in which said output voltage exceeds said regulated voltage amount.

15. The voltage boost circuit as recited in claim 9, wherein said voltage multiplier comprises a first diode and a second diode, wherein an anode of the first diode is connected to receive the input voltage and a cathode of the first diode is connected to an anode of the second diode and to a boost capacitor.

16. The voltage boost circuit as recited in claim 15, wherein said boost capacitor is coupled between said oscillator and the first and second diodes.

17. A regulated power supply for a portable load device, comprising:

a power source;

an oscillator having an input and an output, said input is adapted to receive an input voltage and a reference voltage derived from said power source;

a voltage multiplier coupled to the output of said oscillator for storing an output voltage thereon which is greater than said input voltage, said voltage multiplier comprises:

a first diode, a second diode and a boost capacitor, wherein an anode of the first diode is connected to receive the input voltage and a cathode of the first diode is connected to an anode of the second diode and to the boost capacitor;

a control regulator having an input adapted to receive a portion of said output voltage and a portion of said input voltage, wherein said control regulator is capable of regulating said output voltage at the output of said voltage multiplier to a regulated voltage amount; and a power transistor having a conductive path modulated by said output voltage, wherein said conductive path is coupled between said input voltage and a portable load device.

18. The regulated power supply as recited in claim 17, wherein said regulated voltage amount is proportional to said input voltage.

19. The regulated power supply as recited in claim 17, wherein said control regulator comprises an output coupled to a charging node associated with said oscillator for shorting said node during times in which said output voltage exceeds said regulated voltage amount.

20. The regulated power supply as recited in claim 17, wherein said oscillator comprises three comparators connected in series with an output of said control regulator connected to a charging node configured between a pair of series-connected comparators for shorting said node during times in which said output voltage exceeds said regulated voltage amount.

21. The regulated power supply as recited in claim 17, wherein said boost capacitor is coupled between said oscillator and the cathode of said first diode.

22. The regulated power supply as recited in claim 17, further comprising:

a plurality of power transistors including a plurality of gates and conductive paths, said gates are adapted to receive said output voltage and said conductive paths are coupled between said power source and a plurality of portable load devices; and a plurality of control circuits, each control circuit having an output connected to a respective said gate for selectively controlling said output voltage being sent to said power transistors.

23. The regulated power supply as recited in claim 22, wherein said load devices comprise a standby load circuit, a main power load circuit and a battery, each load device is capable of drawing power through a respective said conductive path in response to the output of respective said control circuit.

* * * * *